United States Patent Office 3,542,758
Patented Nov. 24, 1970

3,542,758
BASIC MONOAZO DYESTUFFS
Gert Hegar, Basel, Switzerland, assignor to Ciba Limited,
Basel, Switzerland, a company of Switzerland
No Drawing. Filed Apr. 17, 1967, Ser. No. 631,124
Claims priority, application Switzerland, Apr. 29, 1966,
6,260/66; Feb. 21, 1967, 2,517/67
Int. Cl. C09b *29/36;* D06p *1/02*
U.S. Cl. 260—156        11 Claims

ABSTRACT OF THE DISCLOSURE

Basic azo-dyestuffs containing an o-aminoalkanoyl-phenoxy-p-nitrobenzene as radical of the diazo-component, and the quaternized salts thereof.

---

The present invention is based on the observation that valuable basic azo dyestuffs which are free from acidic groups imparting solubility in water, especially sulphonic or carboxylic acid groups, and which correspond to the formula (1) 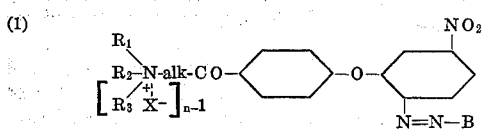

in which B represents the residue of a coupling component, alk represents an alkylene group which may be branched, preferably an ethylene group or especially a methylene group, $R_1$ represents an alkyl, aralkyl, cycloalkyl, amino or cycloamino group, $R_2$ and $R_3$ each represents an alkyl, aralkyl or cycloalkyl group, or $R_1$, $R_2$ and $R_3$, together with the nitrogen atom, may form a heterocyclic ring, X represents an anion and $n$ stands for 1 or 2, may be obtained when (a) a diazotized amine of the formula (2) 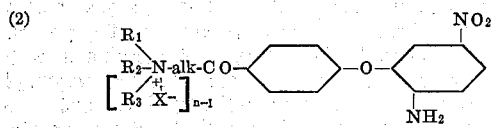

in which $R_1$, $R_2$, $R_3$, X, $n$ and alk have the meanings given above, is coupled with a coupling component, or (b) an azo dyestuff of the formula (3) 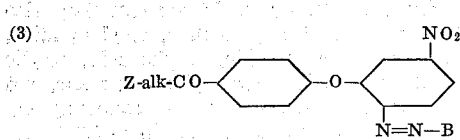

in which Z represents an eliminable atom or an eliminable group, especially a halogen atom or an ester grouping, and alk and B have the meanings given above, is reacted with a secondary or tertiary amine or a hydrazine of the formula (4a) 

or (4b) 

in which $R_1$, $R_2$ and $R_3$ have the meanings given above, or, when $n$ stands for 2, (c) an azo dyestuff of the formula (5) 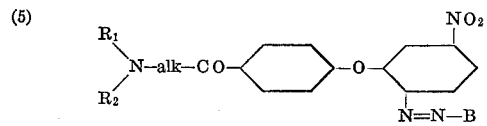

in which $R_1$, $R_2$, alk and B have the meanings given above, is treated with an alkylating agent of the formula $R_3X$, in which $R_3$ and X have the meanings given above.

The manufacture of the new azo dyestuffs process (a) of the invention is preferably effected by coupling a diazotized amine of the Formula 2 with any desired coupling component. The compounds of the Formula 2 may be obtained by condensing an acylated 2-amino-5-nitrodiphenylether with, for example, a chloropropionyl chloride or especially chloroacetyl chloride, in the presence of aluminium chloride, reacting the chloracyl compound so obtained with the appropriate secondary or tertiary amine or hydrazine and splitting off the acyl group. These compounds are new and the process for their manufacture is also included in the present invention.

In process (a) of the invention, the amines of the Formula 2, subsequent to diazotization, may be coupled with any desired coupling component, for example, with those of the benzene or naphthalene series or those of the heterocyclic series. The coupling components of the benzene series which may be mentioned in addition to the phenols, for example, para-cresol, are, in particular, the aminobenzenes, for example, aniline, 3-methylaniline, 2-methoxy-5-methylaniline,
3-acetylamino-1-aminobenzene,
N-methylaniline,
N-β-hydroxyethylaniline,
N-β-methoxyethylaniline,
N-β-cyanoethylaniline,
N-β-chloroethylaniline,
dimethylaniline,
diethylaniline,
N-methyl-N-benzylaniline,
N-n-butyl-N-β-chloroethylaniline,
N-methyl-N-β-cyanoethylaniline,
N-methyl-N-β-hydroxyethylaniline,
N-ethyl-N-β-chloroethylaniline,
N-methyl-N-β-acetoxyethylaniline,
N-ethyl-N-β-methoxyethylaniline,
N-β-cyanoethyl-N-β-chloroethylaniline,
N-cyanoethyl-N-acetoxyethylaniline,
N,N-di-β-hydroxyethylaniline,
N,N-di-β-acetoxyethylaniline,
N-ethyl-N-β-hydroxy-3-chloropropylaniline,
N,N-di-β-cyanoethylaniline,
N,N-di-β-cyanoethyl-3-methylaniline,
N-β′-cyanoethyl-N-β″-hydroxyethyl-3-chloroaniline,
N,N-di-β-cyanoethyl-3-methoxyaniline,
N,N-dimethyl-3-acetylaminoaniline,
N-ethyl-N-β-cyanoethyl-3-acetylaminoaniline,
N,N-di-β-cyanoethyl-2-methoxy-5-acetylaminoaniline,
N-methyl-N-phenacylanilines,
N-β-cyanoethyl-2-chloroaniline,
N,N-diethyl-3-trifluoromethylaniline,
N-ethyl-N-phenylaniline,
diphenylamine,
N-methyldiphenylamine,
N-methyl-4-ethoxydiphenylamine or
N-phenylmorpholine.

The coupling components of the naphthalene series which may be mentioned in addition to the naphthols are, for example, 1- or 2-naphthylamine, 2-phenylaminonaphthalene, 1-dimethylaminonaphthalene or 2-ethylaminonaphthalene. Heterocyclic coupling components which may be mentioned are, for example, the indoles, for example, 2-methylindole, 2,5-dimethylindole, 2,4-dimethyl-7-methoxyindole, 2-phenyl- or 2-methyl-5-ethoxyindole, 2-methyl-5- or 6-chloroindole,
1,2-dimethylindole,
1-methyl-2-phenylindole,
2-methyl-5-nitroindole,
2-methyl-5-cyanoindole,
2-methyl-7-chloroindole,
2-methyl-5-fluoro- or 5-bromoindole,
2-methyl-5,7-dichloroindole or 2-phenylindole and
1-cyanoethyl-2,6-dimethylindole;

pyrazoles, for example, 1-phenyl-5-aminopyrazole or 3-methylpyrazolone-5 or 1-phenyl-3-methylpyrazolone-5, 1,3-dimethylpyrazolone-5, 1-butyl-3-methylpyrazolone-5, 1-hydroxyethyl-3-methylpyrazolone-5,
1-cyanoethyl-3-methylpyrazolone-5,
1-(ortho-chlorophenyl)-3-methylpyrazolone-5,
3-carboxymethoxypyrazolone-5;

quinolines, for example, 1-methyl-4-hydroxyquinolone-2, N - ethyl - 3-hydroxy-7-methyl-1,2,3,4-tetrahydroquinoline or pyrimidines, for example, barbituric acid.

Diazotization of the above-mentioned diazo components may be carried out by known methods, for example, with the aid of a mineral acid, especially hydrochloric acid, and sodium nitrite.

Coupling may also be carried out in known manner, for example, in an acid to alkaline medium, if necessary, in the presence of sodium acetate or a similar buffer which influences the rate of coupling, or a catalyst, for example, pyridine or a salt thereof.

The new dyestuffs may also be manufactured by process (b) of the invention by amidation or hydrazidation, wherein dyestuffs of the Formula 3, in which Z contains a reactive group or a reactive atom, for example, a β-sulphato or a β-chloroethylamino group or a halogen atom, are reacted with a secondary or tertiary amine or hydrazine. The azo dyestuffs used as starting materials in this embodiment of the invention may be obtained from the appropriate components by coupling in accordance with the procedure given above. Reaction with the secondary or tertiary amines or hydrazines is advantageously performed by heating in an excess of the amine in the presence or absence of a solvent. Suitable secondary or tertiary amines or hydrazines are, for example, dimethylamine, diethylamine, diethanolamine, trimethylamine, triethylamine, triethanolamine, pyridine, picoline, lutidine, piperidine, dimethylcyclohexylamine, piperazine, morpholine, thiomorpholine, quinoline, pyrimidine or pyrrolidine, N - methylhydrazine, N,N'-dimethylhydrazine, N,N-dimethylhydrazine or N-aminopiperidine.

Reaction with a secondary amine or hydrazine produces the corresponding tertiary amino or hydrazino compounds, and reaction with a tertiary amine or hydrazine produces the corresponding quaternary amino or hydrazino compounds.

The new dyestuffs that contain a quaternated amino or hydrazino group ($n=2$) may be obtained by a third embodiment of the invention i.e. process (c) in which the appropriate dyestuffs, which contain a tertiary amino or hydrazino group, are quaternated by treatment with alkylating agents. Suitable alkylating or quaternating agents are, for example, esters of strong mineral acids or organic sulphonic acids, for example, dimethyl sulphate, diethyl sulphate, alkyl halides, for example, methyl chloride, methyl bromide or methyl iodide, aralkyl halides, for example, benzyl chloride, esters of low-molecular-weight alkane sulphonic acids, for example, methylesters of methane sulphonic acid, ethane sulphonic acid or butane sulphonic acid, and esters of benzene sulphonic acids, which may contain additional substituents, for example, methyl, ethyl, propyl or butyl esters of benzene sulphonic acid, of 2- or 4-methylbenzene sulphonic acid, 4-chlorobenzene sulphonic acid or 3- or 4-nitrobenzene sulphonic acid.

It is expedient to effect alkylation by heating in an inert organic solvent, for example, a hydrocarbon, for example, benzene, toluene or xylene, a halogenated hydrocarbon, for example, carbon tetrachloride, tetrachloroethane, chlorobenzene or ortho-dichlorobenzene, or a nitro hydrocarbon, for example, nitromethane, nitrobenzene or nitronaphthalene. It is also possible to use acid anhydrides, acid amides or nitriles as solvents in the alkylation process, for example, acetic anhydride, dimethylformamide or acetonitrile; dimethylsulphoxide may also be used as solvent. A large excess of alkylating agent may also be used instead of a solvent. In this case, care must be taken to ensure that the mixture does not become unduly heated, because the reaction is highly exothermic. However, in most cases it is generally necessary to apply external heat to the reaction mixture to initiate the reaction, particularly when working in the presence of an organic solvent. In special cases, alkylation may also be carried out in an aqueous medium or with the use of an alcohol, if necessary, in the presence of a small amount of potassium iodide.

The dyestuff salts can be purified, if necessary, by dissolving them in water, when any unreacted starting dyestuff can be filtered off as an insoluble residue. The dyestuff may be precipitated from the aqueous solution by the addition of a water-soluble salt, for example, sodium chloride.

The quaternated dyestuffs obtained by the processes of the invention preferably contain as anion the residue of a strong acid, for example, sulphuric acid, or a semi-ester thereof, or the residue of an arylsulphonic acid or a halogen ion. The said anions, which are introduced into the dyestuff molecule in accordance with the invention, may also be replaced by anions of other inorganic acids, for example, phosphoric or sulphuric acid, or by anions of organic acids, for example, formic, acetic, chloracetic, oxalic, lactic or tartaric acids; in some cases it is also possible to use the free bases. The dyestuff salts may also be used in the form of double salts, for example, with halides of elements of Group II of the Periodic Table, especially zinc chloride or cadmium chloride.

The dyestuffs or dyestuff salts containing a quaternated amino group obtained by the processes of the present invention are suitable for dyeing and printing a very wide variety of synthetic fibres, for example, polyvinyl chloride, polyamide and polyurethane fibres, and also fibres made from polyesters of aromatic dicarboxylic acids, for example, polyethylene terephthalate fibres, but especially polyacrylonitrile fibers or polyvinylidene cyanide fibres (Darvan). By polyacrylonitrile fibres is meant principally polymers containing more than 80 percent of acrylonitrile, for example, 80 to 95 percent; they also contain 5 to 20 percent of vinyl acetate, vinyl pyridine, vinyl chloride, vinylidene chloride, acrylic acid, acrylic acid esters, methacrylic acid, methacrylic acid esters, and so forth. These products are sold under the following registered trade-marks: "Acrilan 1656," "Acrilan 41," "Creslan," "Orlon 44," "Crylor HH," "Leacril N," "Dynel," "Exlan," "Vonnel," "Verel," "Zefran," "Wolcrylon," "Ssaniw," and also "Orlon 42," "Dralon," "Courtelle," and so forth.

The new dyestuffs produce on these fibres, which may also be dyed in admixture with one another intense and level dyeings possessing a good fastness to light and good properties of general fastness, especially good fastness to washing, perspiration, sublimation, crease-resist finishing, decatizing, hot-pressing, rubbing, carbonizing, water, sea water, dry cleanings, cross-dyeing and solvents. The new dyestuffs of the invention also display, inter alia, good stability in a wide pH range, good affinity in aqueous solutions of different pH values, and good fastness to kier-boiling. Furthermore, the new dyestuffs reserve well on wool and other natural or synthetic polyamide fibres.

The quaternated, water-soluble dyestuffs generally show little sensitivity to electrolytes, and some of them display exceptionally good solubility in water or organic solvents. Dyeing with the quaternated, water-soluble dyestuffs is generally carried out in an aqueous neutral or acid medium at the boil under atmospheric pressure or in a closed vessel at an elevated temperature and under superatmospheric pressure. The ordinary commercially available levelling agents have no deleterious effect if used, but they are not necessary.

The said dyestuffs are also highly suitable for three-colour dyeing. Furthermore, by virtue of their stability to hydrolysis, they may be used with advantage in high-temperature dyeing and for dyeing in the presence of wool. They may also be applied to the fibrous materials by printing processes. In this method of application, a printing paste is used which, in addition to the dyestuff, contains, for example, the usual printing adjuvants. The dyestuffs are also suitable for the bulk-colouration of acrylonitrile polymerization products and other plastic, if necessary, dissolved compositions, the colourations produced being fast to light and washing. They are also suitable for colouring oil paints and lacquers, and for dyeing cotton, especially mordanted cotton, cellulose, regenerated cellulose and paper.

The new dyestuffs manufactured by the processes of the invention which are insoluble in water and which contain a tertiary amino group are advantageously used in a state of fine division and in the presence of a dispersing agent, for example, soap, sulphite cellulose waste liquor or a synthetic detergent, or a combination of different wetting and dispersing agents. Prior to dyeing it is generally advantageous to convert the dyestuff into a dyeing preparation which contains a dispersing agent and the finely divided dyestuff in a form such that a fine dispersion is formed when the preparation is diluted with water. Such dyestuff preparations may be obtained in known manner, for example, by precipitating the dyestuff from sulphuric acid and grinding the suspension so obtained with sulphite cellulose waste liquor. The dyestuff may also be ground, if necessary, in a highly efficient grinding device in the dry or wet state in the presence or absence of a dispersing agent. They are also suitable for dyeing and printing a very wide variety of synthetic fibres, for example, polyacrylonitrile, polyvinyl chloride, polyamide or polyurethane fibres, but especially fibres made from polyesters of aromatic dicarboxylic acids, for example, polyethylene terephthalate fibres.

To achieve stronger dyeings, for example, on polyethylene terephthalate fibres, it is advantageous to add a swelling agent to the dyebath, or to carry out the dyeing process under superatmospheric pressure at a temperature above 100° C., for example, at 120° C. Suitable swelling agents are aromatic carboxylic acids, for example, benzoic acid or salicyclic acid, phenols, for example, ortho- or para-hydroxydiphenyl, aromatic halogenated compounds, for example, chlorobenzene, ortho-dichlorobenzene or trichlorobenzene, phenylmethylcarbinol or diphenyl. When carrying out the dyeing process under superatmospheric pressure it is generally advantageous to render the dyebath slightly acid, for example, by the addition of a weak acid, for example, acetic acid.

The new dyestuffs having a tertiary amino group are specially suitable for application by the so-called thermofixation process in which the fabric to be dyed is impregnated at a temperature not exceeding 60° C. with an aqueous dispersion of the dyestuff which advantageously contains 1 to 50 percent of urea and a thickening agent, especially sodium alginate and squeezed in the usual manner. It is advantageously squeezed so as to retain 50 to 100 percent of its dry weight of dyeliquor.

To fix the dyestuff, the fabric so impregnated is heated to a temperature above 100° C., for example, to a temperature between 180 and 220° C., preferably after it has been subjected to a drying operation, for example, in a current of warm air.

The above-mentioned thermofixation process is specially suitable for dyeing union fabrics made from polyester fibres and cellulosic fibres, especially cotton. In this case, the padding liquor contains, in addition to the dyestuff to be used in accordance wtih the invention, dyestuffs which are suitable for dyeing cotton, for example, direct dyestuffs or vat dyestuffs, or especially so-called reactive dyestuffs, that is to say, dyestuffs that can be fixed on the cellulosic fibre with formation of a chemical bond, for example, dyestuffs which contain a chlorotriazine or a chlorodiazine residue. In the latter case, it has been found to be advantageous to add an agent capable of binding acid to the padding solution, for example, an alkali metal carbonate or an alkali metal phosphate or an alkali metal borate or perborte, or a mixture thereof. When using vat dyestuffs, the padded fabric has to be treated subsequent to the heat treatment with an aqueous alkaline solution of one of the reducing agents commonly used in vat dyeing.

The dyeings produced on polyester fibres by the said process are advantageously subjected to an after-treatment, for example, by heating with an aqueous solution of a non-ionic detergent.

The said dyestuffs are also suitable for dyeing union fabrics made from polyester fibre and wool; the wool portion of the fabric is reserved and can subsequently be dyed with a wool dyestuff.

The dyestuffs may also be applied by printing processes. In this method of application the printing paste contains, for example, the finely divided dyestuff, if necessary, in admixture with one of the above-mentioned cotton dyestuffs, if necessary, in the presence of urea and/or an agent capable of binding acid together with the adjuvants normally used in printing, for example, wetting and thickening agents.

The processes indicated produce strong dyeings and prints possessing excellent properties of fastness, especially good fastness to light, sublimation, decatizing washing and chlorinated water. A further advantage of the dyestuffs to be used in accordance with the invention is that they reserve well on wool and cotton.

Unless otherwise stated, the parts and percentages in the following examples are by weight, and the temperatures are expressed in degrees centigrade.

EXAMPLE 1

272 parts of 2-acetylamino-5-nitrodiphenylether are stirred into 1,000 parts of carbon disulphide, and then 200 parts of chloracetyl chloride are added. 475 parts of powdered aluminium cloride are then added in portions at 30 to 40° C. within 2 hours, and the batch is stirred at 40 to 45° C. until the evolution of hydrogen chloride ceases. The solvent is decanted, the residue is decomposed with ice, and the reaction product is isolated by filtration. The 2-acetylamino-5-nitro-4'-chloracetyldiphenyl-ether so obtained melts at 181° C after recrystallization.

175 parts of the chloracetyl compound are stirred for 12 hours at room temperature together with 500 parts of acetone and 125 parts of an aqueous 4 N trimethylamine solution. 150 parts of 36% hydrochloric acid are then added, the acetone is evaporated, the batch is boiled under reflux for 2 hours and then diluted with water to 1 litre.

200 parts of the aqueous solution so obtained which contains hydrochloric acid and 36.6 parts of 2-amino-5-nitro - 4' - (α,N-chlorotrimethylamino) - acetyldiphenyl ether are diazotized at 10 to 15° C. by the addition of 25 parts of a 4 N sodium nitrite solution. The solution so obtained is run into a solution of 19.9 parts of N,N-bis-cyanoethylaniline in 200 parts of dimethylformamide, and then 4 N sodium acetate solution is added in an amount sufficient to render the reaction mixture neutral to Congo paper. The batch is bulked to 1 litre with water, the dyestuff is precipitated with sodium chloride when coupling is finished, isolated by filtration and dried. The dyestuff so obtained dyes polyacrylonitrile fibres reddish orange tints possessing an excellent fastness to light.

Dyestuffs yielding the tints listed in Column III of the following table may be obtained in an analogous manner with the coupling components listed in Column II.

| I No. | II Coupling component | III Tint |
|---|---|---|
| 1 | N,N-dicyanodiethyl-3-methylaniline | Yellowish red. |
| 2 | N-β-cyanoethyl-N-β'-hydroxyethylaniline | Red. |
| 3 | N-methyl-N-β-cyanoethylaniline | Red. |
| 4 | N,N-dimethylaniline | Claret. |
| 5 | N-ethyl-N-β-hydroxyethylaniline | Violet. |
| 6 | N,N-dibenzylaniline | Red. |
| 7 | Diphenylamine | Brown-red. |
| 8 | 2-aminonaphthalene | Violet. |
| 9 | 2-methylindole | Orange. |
| 10 | 3-methylpyrazolone-(5) | Yellow. |

Dyeing prescription 1 part of the dyestuff obtained in the manner described in paragraphs 1 to 3 of Example 1 is dissolved in 5,000 parts of water in the presence of 2 parts of 40% acetic acid. 100 parts of dried polyacrylonitrile staple fibre yarn are entered into this dyebath at 60° C., the temperature is raised to 100° C. within 30 minutes and dyeing is carried out for one hour at the boil. The yarn is then well rinsed and dried.

EXAMPLE 2

25 millilitres of an aqueous solution containing hydrochloric acid and 3.86 parts of 2-amino-5-nitro-4'-(α,N-chloropyridino)-acetyldiphenylether obtained in the manner described in the first and second paragraphs of Example 1, but using an equivalent amount of pyridine instead of trimethylamine, are diazotized in the manner described in the third paragraph of Example 1, and the diazo compound is coupled with 2.99 parts of N,N-bis-cyanoethylaniline. The dyestuff is then precipitated by the addition of sodium bromide. It is virtually identical in respect of its dyeing properties with the dyestuff described in Example 1.

The dyestuffs yielding the tints indicated in Column III of the following table may be obtained by using the coupling components listed in Column II instead of N,N-bis-cyanoethylaniline.

| I | II | III |
|---|---|---|
| 1 | 1,2-dimethylindole | Orange. |
| 2 | 5-amino-1-phenylpyrazole | Yellow. |
| 3 | 1-phenyl-3-methylpyrazolone | Do. |
| 4 | 3-amino-4-methoxytoluene | Claret. |
| 5 | N,N-bis-chloroethyl-1,3-toluidine | Red. |

Diazo components which yield dyestuffs having similar properties when coupled with the above-mentioned coupling components are obtained when the pyridine is replaced by an equivalent amount of triethylamine, N,N-dimethylhydrazine, N-aminopiperidine, N-methylpiperidine or N-methylmorpholine.

EXAMPLE 3

35 parts of the 2-acetylamino-5-nitro-4'-chloracetyl-diphenylether prepared in the manner described in the first paragraph of Example 1 are dissolved in 100 parts of acetone. 34 parts of piperidine are added and the whole is stirred for 6 hours at 50° C. Salts which precipitate are removed from the solution by filtration and the filtrate is evaporated. The oily residue is dissolved in 250 parts of 2 N hydrochloric acid and the solution is stirred for 2 hours at 90° C. to split off the acetyl group. 200 parts of the aqueous solution obtained which contains hydrochloric acid and 35.5 parts of 2-amino-5-nitro-4'-(α-N-piperidino)-acetyldiphenylether are diazotized at 10 to 15° C. by the addition of 25 parts of a 4 N sodium nitrite solution. The solution so obtained is run into a solution of 19.9 parts of N,N-bis-cyanoethylaniline in 200 parts of dimethylformamide, and then 4 N sodium acetate solution is added in an amount such that the reaction mixture reacts neutral to Congo paper. The batch is bulked to 1 litre by the addition of water, the dyestuff is precipitated when coupling is finished by the addition of sodium chloride, isolated by filtration and dried. It dyes polyacrylonitrile fibres reddish orange tints possessing an excellent fastness to light.

Dyestuffs yielding the tints listed in Column III of the following Table may be obtained in an analogous manner with the coupling components listed in Column II.

| I | II | III |
|---|---|---|
| 1 | N,N-dicyanodiethyl-3-methylaniline | Yellowish red. |
| 2 | N-β-cyanoethyl-N-β'-hydroxyethylaniline | Red. |
| 3 | N-methyl-N-β-cyanoethylaniline | Red. |
| 4 | N,N-dimethylaniline | Claret. |
| 5 | N-ethyl-N-β-hydroxyethylaniline | Violet. |
| 6 | N,N-dibenzylaniline | Red. |
| 7 | Diphenylamine | Brown-red. |
| 8 | 2-aminonaphthalene | Violet. |
| 9 | 2-methylindole | Orange. |
| 10 | 1,2-dimethylindole | Do. |
| 11 | 3-methylpyrazolone-(5) | Yellow. |
| 12 | N-ethyl-2-naphthylamine | Violet. |

Diazo components which produce dyestuffs having similar properties when coupled with the above-mentioned coupling components may be obtained by replacing the piperidine with an equivalent amount of morpholine, diethylamine or dimethylamine and following the same procedure as that described in the first paragraph above.

EXAMPLE 4

35 parts of 2-acetylamino-5-nitro-4'-chloroacetyldiphenylether are boiled under reflux together with 25 parts of concentrated hydrochloric acid and 50 parts of water until dissolution is complete. The solution is allowed to cool, 200 parts of ice are added, and then 25 parts of an aqueous 4 N sodium nitrite solution are quickly added. The diazo solution so obtained is run into a solution of 14.5 parts of 1,2-dimethylindole in a mixture of 50 parts of glacial acetic acid and 50 parts of water at 0° C. while stirring well, and then 30 parts of sodium acetate crystals are slowly added. The sparingly soluble dyestuff is isolated by filtration, washed with water and dried.

The dried dyestuff powder is heated for 1 hour at 100° C. in 100 parts of pyridine, and subsequently the excess pyridine is distilled in vacuo. The residue is dissolved in a hot mixture of 1,000 parts of water and 50 parts of glacial acetic acid, the small amount of unreacted dyestuff is removed by filtration, and the water-soluble dyestuff in the filtrate is precipitated by the addition of 50 parts of sodium chloride. It dyes polyacrylonitrile fibres orange tints possessing a good fastness to light.

Similar orange dyestuffs may be obtained by replacing the pyridine with triethylamine, N-methylmorpholine or N-methylpiperidine.

EXAMPLE 5

10.5 parts of the azo dyestuff which is sparingly soluble in water, obtained in the manner described in Example 3 by coupling diazotized 2-amino-5-nitro-4'-(α-dimethylamino)-acetyldiphenylether with N,N-bis-2-cyanoethylaniline are dissolved at 100° C. in 250 parts of anhydrous chlorobenzene. A solution of 3 parts of dimethyl sulphate in 100 parts of anhydrous chlorobenzene is added at that temperature and the whole is stirred for 3 hours. The quaternary dyestuff salt which precipitates on cooling is isolated by suction filtration, washed with petroleum ether and dried. It dyes polyacrylonitrile fibres fast, reddish orange tints when applied in an aqueous bath.

A similar dyestuff is obtained when the dimethyl sulphate is replaced by 4 parts of benzyl chloride.

EXAMPLE 6

The procedure described in the first and second paragraphs of Example 1 is followed, except that the chloracetyl chloride is replaced by 225 parts of β-chloropropionyl chloride. Reaction with trimethylamine and hydrolysis of the N-acetyl group produces an aqueous solution containing hydrochloric acid and 2-amino-5-nitro - 4'-(β,N-chlorotrimethylamino)-propionyldiphenylether.

45 parts of this solution, which contains 7.6 parts of the diazo component, are cooled to 0° C. by the addition of 50 parts of ice, and then 5 parts of a 4 N sodium nitrite solution are added. The batch is stirred for 2 hours, any small excess of nitrite which may be present is destroyed by the addition of 0.5 part of sulphamic acid, and the diazo solution is then poured into a solution of 2.5 parts of N,N-dimethylaniline in 20 ml. of N hydrochloric acid and 100 parts of ice. The mixture is rendered neutral to Congo paper within one hour by the dropwise addition of a 4 N sodium acetate solution, diluted with 500 parts of water, and the dyestuff is precipitated by the addition of 20 parts of sodium bromide. It is isolated by filtration and dried. The product so obtained is a blue-black powder which dyes polyacrylonitrile fibres claret tints when applied in a bath made slightly acid with acetic acid.

Further dyestuffs which dye polyacrylonitrile fibres the tints indicated in Column III of the following table may be obtained by using as coupling component the compounds listed in Column II instead of N,N-dimethylaniline.

| I | II | III |
|---|---|---|
| 1 | N,N-bis-2-cyanoethylaniline | Orange-red. |
| 2 | N-methyl-N,β-cyanoethylaniline | Red. |
| 3 | Diphenylamine | Brown-red. |
| 4 | 2-methylindole | Orange. |
| 5 | 3-methylpyrazolone-(5) | Yellow. |
| 6 | 1-phenyl-3-methylpyrazolone-(5) | Do. |

Diazo components which produce dyestuffs having similar properties when coupled with the above-mentioned coupling components may be obtained by replacing the trimethylamine mentioned in the first paragraph of this example with equivalent amounts of triethylamine, N,N-dimethylhydrazine, N-methylpiperidine or pyridine.

I claim:
1. Basic azo dyestuffs of the formula

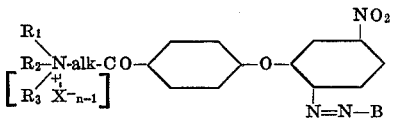

in which B represents the radical of a cyclic coupling component bound to the azo group via a cyclic carbon atom and selected from the group consisting of an unsubstituted or lower alkyl-, lower alkoxy-, chloro- or acylamino containing up to 9 carbon atoms, -substituted hydroxybenzene, aminobenzene, hydroxynaphthalene or aminonaphthalene, an unsubstituted or lower alkyl-, lower alkoxy-, chloro-, cyano-, nitro- or phenyl-substituted indole, an unsubstituted or lower alkyl-, phenyl or carboxy-substituted 5-hydroxy- or 5-aminopyrazole, an unsubstituted or lower alkyl-, lower alkoxy- or chloro-substituted 4-hydroxyquinolone-2, an unsubstituted or lower alkyl-substituted tetrahydroquinoline or an amino- or hydroxy-substituted pyrimidine; alk is selected from the group consisting of methylene, ethylene, propylene and isopropylene; $R_1$ is selected from the group consisting of lower alkyl, hydroxy lower alkyl, benzyl and cyclohexyl; $R_2$ is lower alkyl- or hydroxy lower alkyl; $R_3$ is selected from the group consisting of lower alkyl, hydroxy lower alkyl, benzyl, cyclohexyl, amino and N-lower alkyl substituted amino; and $R_1$ and $R_2$ when taken together with the nitrogen form an unsubstituted or lower alkyl-substituted piperidine, morpholine, thiomorpholine, piperazine or pyrrolidine ring; and $R_1$, $R_2$ and $R_3$ when taken together with the nitrogen form an unsubstituted or lower alkyl-substituted pyridinium ring; wherein X is an anion of a strong inorganic acid, of a sulphuric acid semi ester or of a carboxylic or sulfonic acid; and n is a positive whole number of at most 2.

2. Basic azo dyestuffs of the formula

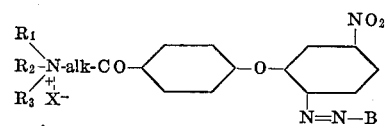

in which B represents the radical of a cyclic coupling component bound to the azo group via a cyclic carbon atom and selected from the group consisting of an unsubstituted or lower alkyl-, lower alkoxy-, chloro- or acylamino containing up to 9 carbon atoms, -substituted hydroxybenzene, aminobenzene, hydroxynaphthalene or aminonaphthalene, an unsubstituted or lower alkyl-, lower alkoxy-, chloro-, cyano-, nitro- or phenyl-substituted indole, an unsubstituted or lower alkyl-, phenyl- or carboxy-substituted 5-hydroxy- or 5-aminopyrazole, an unsubstituted or lower alkyl-, lower alkoxy- or chloro-substituted 4-hydroxyquinolone-2, an unsubstituted or lower alkyl-substituted tetrahydroquinoline or an amino- or hydroxy-substituted pyrimidine; alk is selected from the group consisting of methylene, ethylene, propylene and isopropylene; $R_1$ is selected from the group consisting of lower alkyl, hydroxy lower alkyl, benzyl and cyclohexyl; $R_2$ is lower alkyl- or hydroxy lower alkyl; $R_3$ is selected from the group consisting of lower alkyl, hydroxy lower alkyl, benzyl, cyclohexyl, amino and N-lower alkyl substituted amino; and $R_1$ and $R_2$ when taken together with the nitrogen form an unsubstituted or lower alkyl-substituted piperidine, morpholine, thiomorpholine, piperazine or pyrrolidine ring; and $R_1$, $R_2$ and $R_3$ when taken together with the nitrogen form an unsubstituted or lower alkyl-substituted pyridinium ring; and wherein X is an anion of a strong inorganic acid, of a sulphuric acid semi ester or of a carboxylic or sulfonic acid.

3. Basic azo dyestuffs as claimed in claim 1, in which B represents the radical of a member selected from the group consisting of 3-methyl-pyrazolone, 2-lower-alkyl indole and a phenyl- or naphthylamine of which the amino group is substituted by lower alkyl, phenyl lower alkyl or phenyl.

4. Basic azo dyestuffs as claimed in claim 1, in which B is a member selected from the group consisting of N-lower alkylaminobenzene, N-cyano lower alkylaminobenzene and N,N-dicyano-lower alkylaminobenzene and substituted N-lower alkylaminobenzene, N-cyano lower alkylaminobenzene and N,N-dicyano-lower alkylaminobenzene wherein the substituents are selected from the group consisting of chlorine, lower alkyl, lower alkoxy, lower alkanoylamino or lower carbamoylamino.

5. Basic azo dyestuffs as claimed in claim 1, which corresponds to the formula

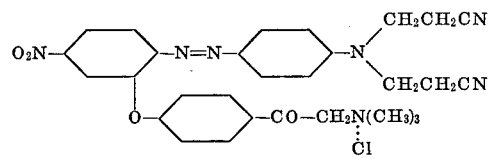

6. Basic azo dyestuffs as claimed in claim 1, which corresponds to the formula

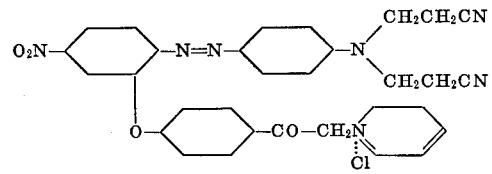

7. Basic azo dyestuffs as claimed in claim 1, which corresponds to the formula

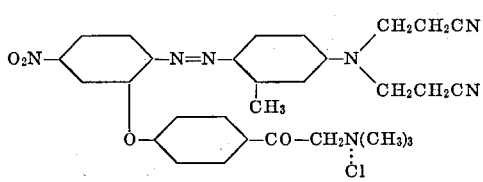

8. Basic azo dyestuffs as claimed in claim 1, which corresponds to the formula

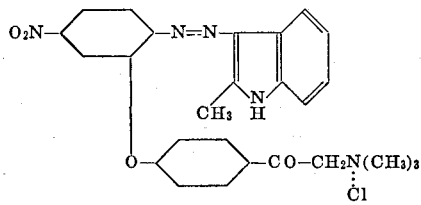

9. Basic azo dyestuffs as claimed in claim 1, which corresponds to the formula

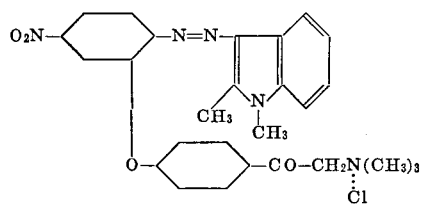

10. Basic azo dyestuffs as claimed in claim 1, which corresponds to the formula

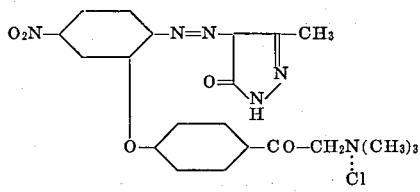

11. Basic azo dyestuffs as claimed in claim 1, which corresponds to the formula

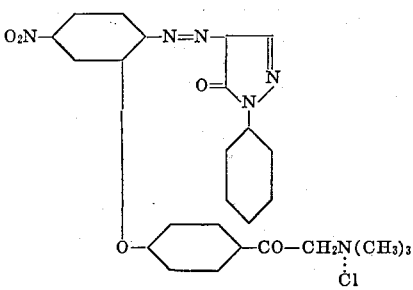

References Cited

UNITED STATES PATENTS 2,821,526   1/1958   Boyd  ------------ 260—156 X
3,117,960   1/1964   Illy  -------------- 260—156

CHARLES B. PARKER, Primary Examiner

D. M. PAPUGA, Assistant Examiner

U.S. Cl. X.R.

8—41, 51, 55; 106—288; 117—154; 260—37, 146, 152, 154, 155, 162, 165, 196, 198, 199, 205, 206, 207, 207.1. 459, 501.13, 567.6